April 6, 1965  A. W. KLEINSCHMIDT ETAL  3,177,081

PACKAGED DOUGH PRODUCTS FOR REFRIGERATED STORAGE

Filed Jan. 24, 1964

INVENTORS
ALBERT W. KLEINSCHMIDT
KAZUO HIGASHIUCHI

BY *Arnold, Roylance & Harris*

ATTORNEYS

United States Patent Office 3,177,081
Patented Apr. 6, 1965

3,177,081
PACKAGED DOUGH PRODUCTS FOR REFRIGERATED STORAGE
Albert W. Kleinschmidt, Park Forest, and Kazuo Higashiuchi, Chicago, Ill., assignors to J. R. Short Milling Company, Chicago, Ill., a corporation of Illinois
Filed Jan. 24, 1964, Ser. No. 341,799
6 Claims. (Cl. 99—172)

This application is a continuation-in-part of our application Serial No. 309,486, filed September 17, 1963, now abandoned.

This invention relates to packaged dough products for refrigerated storage, and to methods for producing the same. While not limited thereto, the invention is particularly applicable to the production of packaged preleavened biscuits.

In recent years, it has become common practice in the grocery products trade to market packaged dough products which are stored under normal refrigeration (e.g., 40° F.) until the package is opened for baking of the products. One of the most popular of these refrigerated dough products is the preshaped, preleavened biscuit, packaged in accordance with U.S. Patent 2,793,126, issued May 21, 1957, to Fienup et al., for example. The biscuit preforms may be disk shaped, and ten or more of the preforms are disposed in face-to-face contact in the package, substantially or completely filling the container. Though the container for such products may take various forms and may be opened in any of various ways, it is necessary in all cases that the biscuit dough preforms be separated from each other preparatory to baking.

Doughs suitable for refrigerated storage tend to be somewhat sticky and prior-art workers have encountered considerable difficulty in developing production and packaging procedures capable of providing dough products which can be separated from each other reasonably conveniently when the package is opened. Usually, the dough pieces are liberally dusted with a dusting flour, or are coated with an oil. One of the more successful practices has been to use rice flour as a dusting flour, applying the rice flour first to the initial dough mass before sheeting, and then to the sheeted dough before the dough pieces are cut therefrom, so that the major faces of the cut dough pieces are liberally covered and tend less to stick to each other in the package.

The dough pieces are prepared and packaged by high speed automatic equipment. Thus, in the case of biscuits, the biscuit preforms are cut and supplied to the container at rates as high as three per second. Such high speed operation has made it difficult to accomplish dusting without an inordinate waste of the dusting flour, even when a product such as rice flour, which has good flow properties, is employed. Not only is the waste of dusting flour itself a material economic loss, but the collection of waste dusting flour around the equipment increases the amount of labor involved. Finally, there has been a tendency for the dusting flour to clog or plug the machinery, causing economic losses due to down time and increased maintenance requirements. Because of these difficulties, some producers have chosen to use a coating oil rather than a dusting flour.

In all, there is an active and continuing need for an improved method which will assure good separation of the dough pieces when the package is opened, and will, as a secondary objective, reduce the economic losses presently encountered.

A general object of the present invention is to devise an improved method for producing packaged dough products for refrigerated storage, and improved packaged products of this type.

Another object is to devise such a method employing a relatively inexpensive dusting flour composition to produce novel and improved packaged refrigerated dough preforms characterized by enhanced separation of the preforms from each other when the package is opened.

A further object is to provide such a method characterized by use of a dusting flour and wherein substantial savings are achieved in the amount of dusting flour required, and losses due to clogging or plugging of machinery are markedly decreased.

In order that the manner in which these and other objects are achieved in accordance with the invention can be readily understood, advantageous embodiments of the invention will be described with reference to the accompanying drawings, which form a part of this specification, and wherein.

Figure 1:
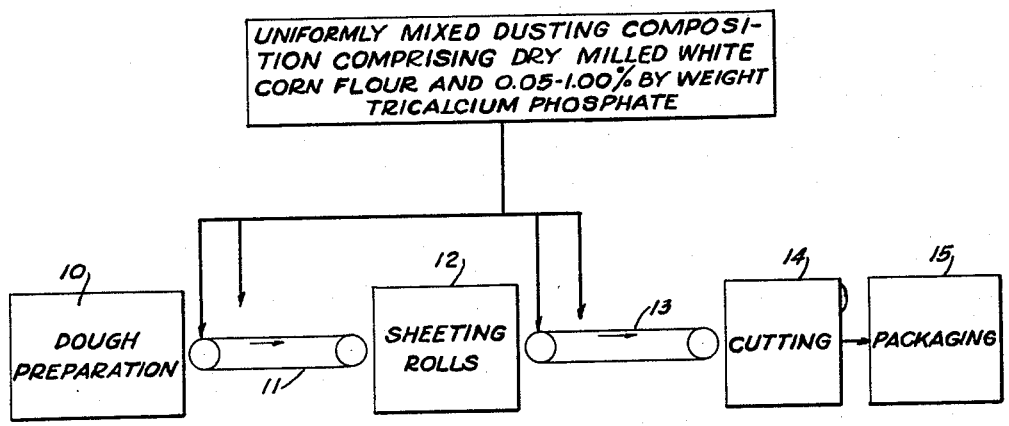
FIG. 1 is a flow diagram illustrating a preferred method embodiment of the invention.

In general, the invention is based upon the discovery that finely particulate tricalcium phosphate possesses surface properties which are unique with reference to starchy flours of the class consisting of corn flour, wheat flour, potato flour, and rice flour, so that the addition of small proportions of tricalcium phosphate to such flours, or mixtures thereof, not only imparts desirable flow properties to the flour or flours, but also provides a dusting composition admirably suited for treating dough pieces which are to be packaged and stored under refrigeration. Thus, for example, when biscuit dough preforms are uniformly dusted with a composition comprising at least one of the flours just mentioned and a small proportion of tricalcium phosphate in accordance with the invention, so that the layers of dusting composition on the faces of the dough pieces intervene between the dough pieces in the finished package, far better separation of the dough pieces results on opening of the package than has been attained with any prior-art dusting material.

Though the precise reasons for success with the dusting compositions of this invention are not completely understood, it appears that the extremely fine particles of tricalcium phosphate employed adhere to the surfaces of larger particles of the flour, so that the flour particles are surrounded by the tricalcium phosphate and thus isolated. While this phenomenon is, of course, important in attaining good flow properties, it is of most importance in connection with the function of the dusting composition in assuring good separation of the dough pieces upon opening of the package. In this regard, it appears that the effect of the tricalcium phosphate is to at least minimize hydration of the starchy flour particles by the aqueous phase of the dough pieces.

The relative particle sizes of the flour and tricalcium phosphate are of particular importance in accordance with the invention. The flour must be of such fineness that at least 50% thereof has a particle size smaller than 150 microns. Best results are attained when 75% of the flour has a particle size smaller than 150 microns. The tricalcium phosphate, on the other hand, must have a particle size predominantly smaller than 75 microns, and especially good results are attained when the tricalcium phosphate is predominantly smaller than 45 microns.

The tricalcium phosphate is employed in an amount equal to 0.05–1.00% by weight, the optimum proportion varying inversely as the particle size of the starchy flour. Thus, with finer flours, more of the tricalcium phosphate is employed, while less of the tricalcium phosphate is employed when the flour used is of coarser particle size.

Though the invention is operative with corn flour, wheat flour, potato flour, and rice flour as a class, so that any one of these flours alone, or any mixture thereof, can be successfully employed, superior results are attained with corn flours obtained by dry milling white corn grits. Thus, in accordance with the most advantageous embodiments of the invention, the flour used is a white corn flour prepared by dry milling clean, fines-free white corn grits in the particle size range of 4–50 mesh (U.S. Standard), milling being carried out in such fashion that the flour is of such fineness that at least 75% thereof has a particle size smaller than 150 microns. Such flours can be milled with a material proportion of larger particles and we have found that it is highly desirable for at least 10% of the flour to have a particle size in the range of 150–300 microns. Such dry milled white corn flour is employed without modification and retains the predominant proportion of its native fat content, the fat being at least 0.3% by weight and, ordinarily, in the range of 0.5–0.7% by weight, it being understood that the grits from which the flour is milled constitute a corn fraction poor in the germ of the corn. When present in this amount, the native fat of the corn flour tends to promote adherence of the fine tricalcium phosphate particles to the surfaces of the corn flour particles.

The flour and the tricalcium phosphate are mixed together in any suitable mixing apparatus. Thus, for example, a conventional flour blender or a rubber blender can be employed. Agitation of the flour and tricalcium phosphate is effective not only to assure a uniform mixture but also to provide maximum opportunity for contact between the extremely fine particles of tricalcium phosphate and the large total surface area presented by the flour particles.

The following example illustrates preparation of a particularly advantageous dusting composition in accordance with the invention:

*Example 1*

Employing a conventional flour blender, 99.85 parts by weight of corn flour prepared by dry milling clean white corn grits of 6–16 mesh (U.S. Standard) was uniformly mixed with 0.15 part by weight of food grade tricalcium phosphate. The corn flour contained 0.60% by weight native fat. 78.0% by weight of the corn flour passed a 100 mesh screen and, therefore, had a particle size smaller than 150 microns. The remaining 22% of the corn flour had a particle size larger than 150 microns, 0.6% being 300 microns of larger, 1.4% being in the range of 200–300 microns, and 20.0% being in the range of 150–200 microns. The tricalcium phosphate was of such fineness that all passed a 325 mesh screen, so that 100% of the tricalcium phosphate was smaller than 45 microns.

Figure 2:
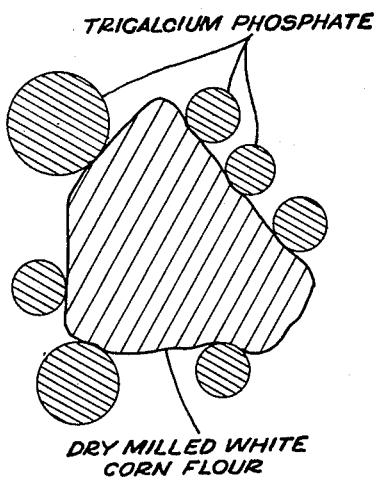
FIG. 2 is a diagrammatic illustration of one particularly advantageous dusting composition employed in accordance with the invention.

Mixing of the corn flour and tricalcium phosphate provided a uniform blend wherein, though a major proportion of the tricalcium phosphate remained free, a material proportion thereof adhered to the surfaces of the corn flour particles, as illustrated diagrammatically in FIG. 2.

The following example is illustrative of the present method, as applied to production of packaged, preleavened biscuit dough preforms for refrigerated storage:

*Example 2*

The method was carried out in a commercial scale plant for producing biscuit preforms of conventional preleavened dough composition, the preforms being packaged generally in accordance with the aforementioned Patent 2,793,126, issued to Fienup et al. As illustrated diagrammatically in FIG. 1, the operation was carried out on high speed automated equipment involving a dough preparation stage 10, conveyor means 11 for delivering the dough to a set of sheeting rolls indicated at 12, conveyor means 13 for delivering the sheeted dough to a dough severing device 14, and means 15 for packaging the dough preforms provided by the severing device. The particular plant employed had been operated with rice flour as a dusting flour, so that the operating personnel were able to compare the results of the present method with those previously obtained when using rice flour on the same equipment.

Figure 3:
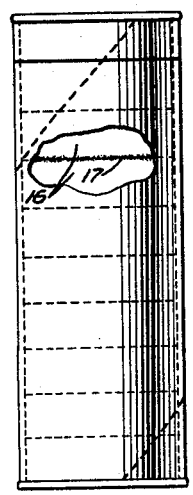
FIG. 3 is a view in side elevation, with parts broken away for clarity of illustration, of a package of biscuit preforms in accordance with the invention.

The dusting composition of Example 1 was employed, being applied to conveyor 11 and to the exposed surfaces of the dough prior to entrance of the dough into the sheeting rolls. Similarly, the dusting composition of Example 1 was applied to conveyor 13 and to the exposed surfaces of the sheeted dough. Severing device 14 was of the type which produces a cylindrical preform by making a circular cut in the dough sheet. While no effort was made to apply the dusting composition to the cylindrical cut edges of the preforms, the dusting operation was such that the flat faces of each preform were well covered by the corn flour-tricalcium phosphate composition. Accordingly, in the dough packages produced, as seen in FIG. 3, the adjacent major faces of the preforms 16 were separated by the dusting composition, indicated at 17.

Though the corn flour-tricalcium phosphate composition of Example 1 exhibits substantially the same flow characteristics as rice flour, fully adequate dusting of the dough was accomplished with an amount of the composition of Example 1 which was approximately 20% less than the amount of rice flour previously employed.

Representative packages were stored at 40° F. for various time periods and then opened for inspection and baking of the dough preforms. In all cases, it was observed that, upon opening of the package, the preforms separated readily from each other, there being so little tendency for the preforms to stick to each other that the preforms usually fell free as the package was opened. The major faces of the preforms, which carried the dusting composition, were found to be smooth, exhibiting no grittiness. The preforms were observed to be more symmetrical and uniform than had been the case when rice flour was employed, and the biscuits after baking were rated as superior in overall characteristics.

The particle size distribution of the special white corn flour of Example 1 can be changed within the ranges hereinbefore specified, though the proportion of tricalcium phosphate employed must ordinarily be increased as the flour is made finer.

The special white corn flour of Example 1 can be replaced wholly or in part by ordinary corn flour, rice flour, wheat flour or potato flour of corresponding particle size distribution. Various combinations of these flours can be employed, so long as the relative proportions and particle size relationships hereinbefore specified are employed.

The following example illustrates the advantages of the present invention in direct comparison with prior-art practices based on use of other dusting flours and dusting flour compositions:

*Example 3*

The method was carried on a laboratory scale, using standard equipment for preparing the dough and employing laboratory scale equipment for forming and packaging biscuit preforms, the preforms being packaged generally in accordance with the aforementioned Patent 2,793,126, issued to Fienup et al.

In preparing the dough, a standard commercial formula for refrigerated biscuit dough was used, as follows.

| Ingredient: | Percent by weight |
|---|---|
| Flour | 49.00 |
| Water | 33.00 |
| Shortening | 4.00 |
| Leavening | 14.00 |
| | 100.00 |

As leavening, the following composition was employed.

| Ingredient: | Parts by weight |
|---|---|
| Sodium acid pyrophosphate | 1.49 |
| Sodium bicarbonate | 1.10 |
| Salt | 1.12 |
| Sugar | 2.49 |
| Whey | 0.80 |
| Flour | 7.00 |
| | 14.00 |

The dough was prepared in standard fashion and cut into individual biscuit preforms preparatory to dusting.

The following dusting flour compositions were employed for comparison, compositions B, C and D being in accordance with this invention:

| Dusting Composition | Flour | Additive | Amount of Additive (percent by Wt.) |
|---|---|---|---|
| A | Dry-milled white corn.[1] | None | |
| B | do.[1] | Tricalcium phosphate [2] | 0.1 |
| C | do.[1] | do.[2] | 0.2 |
| D | do.[1] | do.[2] | 0.3 |
| E | do.[1] | Calcium carbonate [3] | 0.1 |
| F | do.[1] | do.[3] | 0.2 |
| G | do.[1] | do.[3] | 0.3 |
| H | do.[1] | Calcium sulfate (hydrated).[3] | 0.1 |
| I | do.[1] | do.[3] | 0.2 |
| J | do.[1] | do.[3] | 0.3 |
| K | Rice flour [4] | None | |

[1] Of such particle size that 0.2% by weight was larger than 297 microns; 0.8% was 210-297 microns; 20.0% was 149-210 microns; and 79.0% smaller than 149 microns.
[2] Of such particle size that all was smaller than 70 microns.
[3] Of such fineness that all passes a 325 mesh screen so as to be smaller than 44 microns.
[4] Standard commercial dusting flour of the prior art.

The dusting compositions were applied to both major faces of the biscuit preforms through a 30 mesh sieve. The dusted preforms were then packed into standard fiber tube refrigerated biscuit containers of the general type illustrated in the aforementioned Patent 2,793,126, a total of 240 g. (±2 g.) of dough being employed for each container. Ten containers of dusted preforms were prepared with each of dusting compositions A-K. The packaged preforms were proofed at 96° F. for 1 hr. and the containers then placed in refrigerated storage at 40° F. Two containers of preforms dusted with each of dusting compositions A-K were removed from storage at the end of each of 5 test periods, opened for inspection and scoring of the preforms for separation and grittiness, and the preforms then baked at 450° F. for 15 min., the biscuits then being scored for crust color. The 5 test periods were 24 hrs., 1 week, 2 weeks, 3 weeks and 4 weeks.

The scores for the preforms and the baked biscuits at the end of the 4-week period were as follows:

| Dusting Composition | Separation | Grittiness | Biscuit Crust Color |
|---|---|---|---|
| A | Poor | Slight | Golden brown. |
| B | Very good | do | Do. |
| C | Excellent | None | Do. |
| D | do | do | Do. |
| E | Poor | do | Light brown. |
| F | Fair | Slight | Spotted. |
| G | do | do | Do. |
| H | Good | Heavy | Do. |
| I | do | do | Do. |
| J | do | do | Pale. |
| K | Excellent | None | Golden brown. |

Throughout the tests in this example, the preforms and biscuits employing dusting composition B were scored consistently higher than those employing all of the other dusting compositions except composition K. The preforms and biscuits employing dusting compositions C and D in accordance with the invention scored higher than those employing all of the other dusting compositions, including composition K. Recognizing that the composition of Example 1 contained 0.15% by weight of tricalcium phosphate (more finely particulate than the tricalcium phosphate of the present example), with results superior to rice flour, it is evident that the compositions of this invention give results superior to rice flour, so long as the composition comprises the dry-milled corn flour as a main constituent and tricalcium phosphate having a particle size at least as fine as 70 microns and in a proportion at least as great as 0.15% by weight.

Example 3 demonstrates that tricalcium phosphate has a unique relationship to the flour component of the dusting composition aside from acting as a "flow agent" to improve effectiveness of the dusting operation. Thus, compositions E-J employed calcium carbonate and calcium sulfate, both of which are recognized along with tricalcium phosphate as good "flow agents," and the preforms and biscuits employing compositions E-J did not compare favorably with those employing compositions B-D, even though compositions E-J employed the same corn flour as compositions B-D.

When comparing the results attained with dusting compositions in accordance with this invention with the results obtained with rice flour, it is to be noted that rice flour is more expensive than the compositions of this invention. Further, following this invention, as demonstrated in Example 1, very substantial savings in the amount of dusting composition required are achieved when the present invention is followed. Finally, this invention provides an additional saving represented by the smaller clean-up time involved, as compared to rice flour.

What is claimed is:

1. In the production of packaged dough products for refrigerated storage by first preparing a quantity of dough, then forming the dough into a layer of the thickness desired for the product, severing dough pieces from the layer, and depositing a plurality of dough pieces in a container of a type which can be opened and stripped from the contents at the time of use, the improvement comprising
   dusting the surfaces of the layer of the dough, prior to severing the dough pieces, with a uniformly mixed dusting composition comprising a starchy flour selected from the group consisting of corn flour, wheat flour, rice flour and potato flour, and 0.05-1.00% by weight, of tricalcium phosphate which is of finer particle size than said starchy flour,
      said flour being of such fineness that at least 50% thereof has a particle size smaller than 150 microns,
      said tricalcium phosphate having a particle size smaller than 75 microns,
      individual particles of said starchy flour being surrounded and isolated by a plurality of finer particles of said tricalcium phosphate with the finer particles of said tricalcium phosphate adhering to the surfaces of the larger particles of starch flour,
   said dusting step providing on the faces of the dough pieces a uniform layer of said dusting composition and said dusting composition therefore being interposed between adjacent ones of said dough pieces in the package,
      said particles of tricalcium phosphate tending to isolate said starchy flour particles from the aqueous content of the dough pieces, whereby the dough pieces are readily separable from each other upon opening of the container and removal thereof from the dough pieces after prolonged storage under refrigeration.

2. The method of claim 1 wherein
   said flour is corn flour at least 10% by weight of which has a particle size in the range of 150-300 microns.

3. The method of claim 2 wherein said flour is a dry milled flour from white corn grits, at least 10% of said flour having a particle size in the range of 150–300 microns, said corn flour retaining a native fat content equal to at least 0.3% by weight, and said tricalcium phosphate amounts to 0.05–1.00% by weight.

4. The method of claim 3 wherein said corn flour is of such fineness that at least 75% thereof has a particle size smaller than 150 microns.

5. The method of claim 2 wherein said tricalcium phosphate amounts to at least 0.15% by weight.

6. The method of claim 2 wherein said tricalcium phosphate has a particle size smaller than 45 microns.

References Cited by the Examiner
UNITED STATES PATENTS

| | | | |
|---|---|---|---|
| 1,887,162 | 11/32 | Lorber | 99—172 |
| 2,793,126 | 5/57 | Fienup et al. | 99—172 |

A. LOUIS MONACELL, *Primary Examiner.*

RAYMOND N. JONES, *Examiner.*